Aug. 25, 1964 A. KLEINE-ALBERS 3,146,287
METHOD AND APPARATUS FOR CONTROLLING THE SUPPLY OF
ENERGY TO A PLASTIC IN A PLASTICIZING MACHINE
Filed May 10, 1961 4 Sheets-Sheet 4

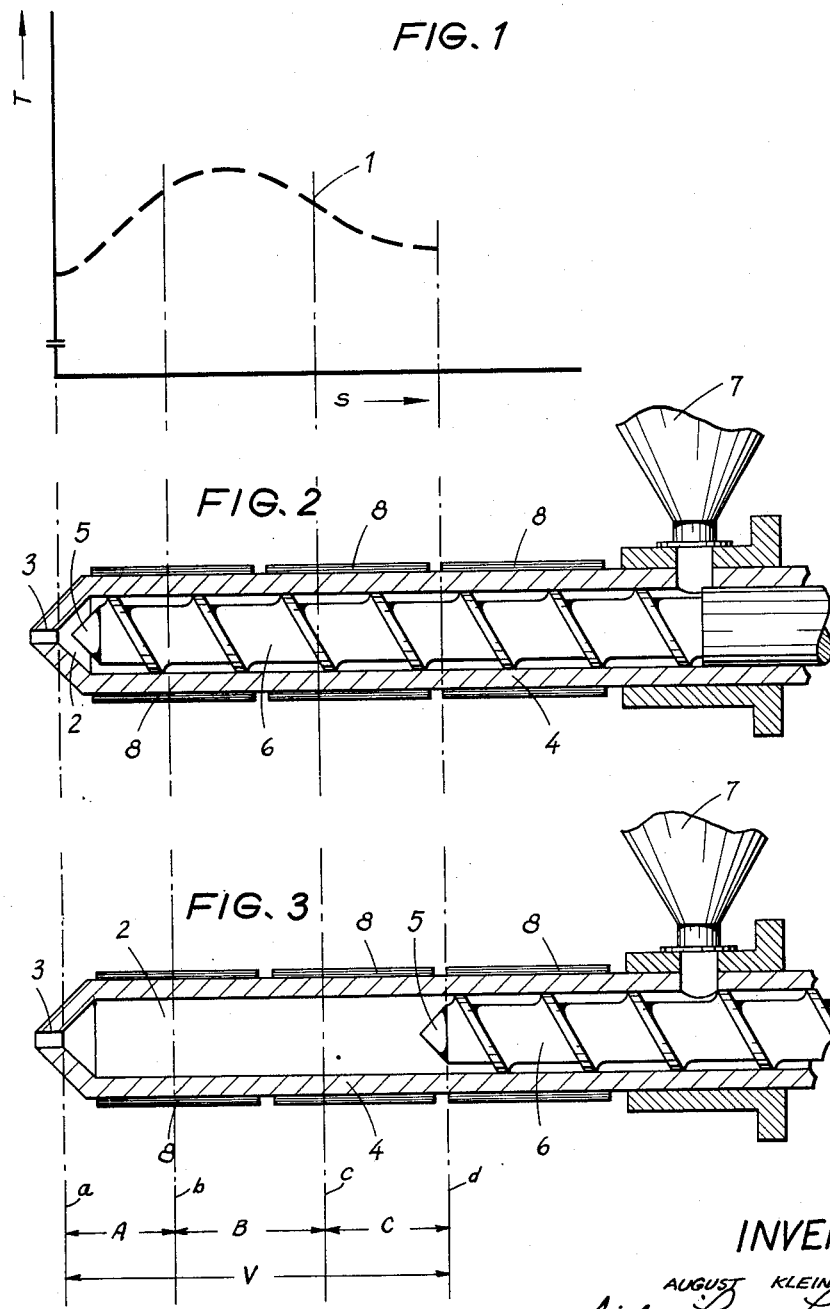

INVENTOR:
AUGUST KLEINE-ALBERS
BY Dicke, Craig & Freudenberg
ATTORNEYS

United States Patent Office 3,146,287
Patented Aug. 25, 1964

3,146,287
METHOD AND APPARATUS FOR CONTROLLING THE SUPPLY OF ENERGY TO A PLASTIC IN A PLASTICIZING MACHINE
August Kleine-Albers, Nurnberg, Germany, assignor to Ankerwerk Gebruder Goller, Nurnberg, Germany
Filed May 10, 1961, Ser. No. 109,219
Claims priority, application, Germany, May 12, 1960, A 34,626; Apr. 7, 1961, A 37,146
5 Claims. (Cl. 264—329)

The present invention relates to screw-type plasticizing machines for plastics, and more particularly to screw extruders, and to a method and apparatus for such plasticizing machines for controlling the supply of required heat energy for plasticizing and melting the plastic material by controlling the rotation of the screw and the back pressure thereon while the screw carries out its function, and the invention serves for adjusting and controlling the pressure, temperature, viscosity, and other conditions of the plastic.

It is an object of the invention to provide a method and means whereby it is possible in the best possible conformity with the characteristic of the respective plastic material to be molded to effect within any single injection cycle a controlled gradual or stepwise adjustment of the speed of rotation of the screw in accordance with the point of time in the cycle of the back pressure upon the screw and the rotation of the screw in accordance with the point of time in the cycle and rate of rotation of the screw, or of the back pressure during the plasticizing and injection process, so that the temperature variations which are caused by the reduction in the effective length of the screw during its reverse movement will be balanced and the temperature of the material flowing into the mold at the begininng and/or at the end of a given shot will be increased and its viscosity decreased so as to provide a uniform temperature and viscosity.

It is conventional after starting a screw extruder to operate the same at a constant rate of rotation. The amount of energy or heat required for plasticizing the plastic is then supplied thereto primarily in the form of frictional heat caused by the friction between plastic and plastic and between the plastic and the metal surfaces, and is affected only to a minor extent by heat conduction of the heat supplied by the outer heating elements on the plasticizing cylinder. There are even some screw extruders known which are not provided with outer heating elements and in which the heat for plasticizing the material is supplied solely through the screw in the form of frictional heat.

When employing a continuously operating screw-type plasticizing machine for manufacturing a product which should be entirely uniform throughout, efforts are usually made to insure that the heat energy which is supplied to the material from the outer heating elements or from the driving energy will be as constant as possible.

There are screw extruders known which are designed so that the velocity of flow and/or the pressure of the pressure medium which is freely supplied to the piston chamber will be adjustable during the return flow. The plasticizing effect of the screw will thereby be affected by the speed of its reverse movement and also by the force of the reaction which is produced by the axial pressure of the screw. Although such machines permit the plasticizing effect to be adapted to the respective material and to the mold to be used, they have the disadvantage that the variations in the temperature of the material which are due to the intermittent operation of the process cannot be balanced within any one shot. Thus, for example, in screw extruders only the outer heating means are controlled so as to produce a constant temperature. The component of the plasticizing heat which is derived from the rotation of the screw, and accordingly also the temperature of the plastic material vary and follow periodically the injection cycle of the machine. These variations occur partly during the plasticizing operation of the screw and they are due to the fact that at the beginning of the injection cycle the screw plasticizes material which has been heated up in the plasticizing cylinder during the inoperative period of the screw, but that toward the end of the cycle the screw works upon cold material which is newly supplied through the feed hopper. Furthermore, the heating zones provided by the outer heating means and the work zones of the plasticizing screw shift at any axial movement of the screw relative to each other and the effective length of the plasticizing screw decreases, so that toward the end of the plasticizing operation the temperature of the material may also decrease.

It may further be proved that, during the periodic operation of the screw, the cylinder and screw temperatures may increase above the temperature level which is set by the outer heating means and that they will again return to the intended level during the inoperative period of the screw.

Even though no further factors will be described in detail which are responsible for the unavoidable and uncontrollable temperature variations, it may be shown by tests that the range of the temperature variations increases progressively as the periods of the work cycles increase.

When carrying out molding operations with screw extruders it is often found to be a disadvantage that the material which flows into the mold at the beginning of the operation is too cold and forms cold-flow streaks around the sprue, that the central part of the material flowing into the mold has the proper temperature, and that the remainder is usually likewise too cold so that the flow seams will be poorly welded together and the sprue area will become solidified too quickly. When the pressure upon the screw is then increased in the usual manner in order to avoid bubbles, the solidified sprue is merely forced into the molded part without, however, being welded thereto. The sprue area will therefore be brittle and inhomogeneous.

The present invention therefore relates to methods and apparatus for balancing gradually or in steps the variations of the temperature which occur within one shot and are caused by the intermittent operation or for adjusting and controlling these variations so as to produce molded parts of a high uniform quality by controlling speed of rotation of the screw in accordance with the point of time in the cycle by controlling the back pressure on the screw and the rotation thereof in accordance with the point of time and the rate of rotation, or by regulating the pressure stage or pressure curve of the back pressure on the screw.

The foregoing objects, features, and advantages of the present invention will become more clearly apparent from the following detailed description thereof which is to be read with reference to the accompanying drawings in which—

FIGURE 1 shows a graphic illustration of the course of the temperature of the material and its dependence upon the distance of travel of the screw within one shot;

FIGURE 2 shows a longitudinal section of a plasticizing cylinder with the screw in its forward position;

FIGURE 3 shows a longitudinal section of a plasticizing cylinder with the screw in its retracted position;

Figure 4:
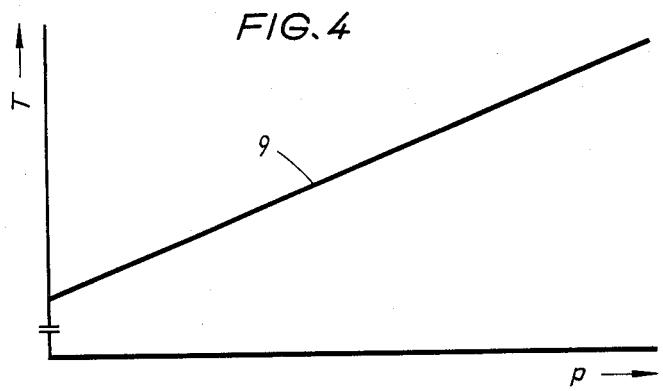
FIGURE 4 shows a graphic illustration of the course of the temperature as a function of the back pressure upon the screw.

The method of the present invention is based upon the fact that the worm 6, or 6' as illustrated in the drawings, and to a certain extent, also the heating bands 8, must plasticize a certain volume of plastic mass which varies in size in accordance with the die or mold used for each working cycle of the apparatus. This volume which is to be conveyed by the worm to the area 2 of cylinder 4 or 4', respectively, is denoted by the letter V in FIGURES 1 to 3.

As already mentioned previously, the component of the plasticizing heat which is derived from the energy which is supplied through the screw shaft, and accordingly also the temperature of the plastic vary periodically in accordance with the injection cycle. These variations are due to the fact that screw 6, as shown in FIGURES 1 through 3, in the initial stages A of a working or injection cycle plasticizes the material which was heated in the plasticizing cylinder 4 during the previous inoperative period of the screw and that in the final stages C of a working cycle, as indicated in FIGURES 1–3, it works upon cold material which is supplied through the feed hopper 7. Furthermore, at a movement of screw 6 in the axial direction, the heating zones 8 of the outer heating means and the work zones of screw 6 are shifted relative to each other and the effective threaded length of the plasticizing screw 6 is reduced, as shown particularly in FIGURE 3, whereby at the end of the plasticizing process, the temperature of the material decreases. The material which at first flows into the mold is also often too cold since it is located during the inoperative period in the direct vicinity of nozzle 3 and is thus cooled to a greater extent than the remainder of the material which is located in the main part of chamber 2.

FIGURE 1 illustrates diagrammatically the course of the temperature as measured during the plasticizing process in a conventional screw extruder and which is dependent upon the distance of travel or the stroke of the screw S. The curve 1 clearly shows that the portions of the material which during the inoperative period of the screw are located in chamber 2 between the nozzle 3 of cylinder 4 and the tip 5 of screw 6, and which flow in the initial stages A and in the final stages C of an injection cycle into the mold are too cold. These colder portions are the cause of the undesirable phenomena in the production of molded parts as previously described.

FIGURES 2 and 3 illustrate the axial displacement of screw 6 in the plasticizing cylinder 4 during the plasticizing process. A comparison between FIGURES 2 and 3 shows that the effective length of the threaded part of screw 6 gradually decreases during the plasticizing in accordance with the reverse movement of the screw.

Unfortunately, it is impossible to overcome the disadvantages of the flow of the cold portions of plastic into the mold at the beginning and end of the injection cycle by increasing the entire temperature level since this might result in a thermal decomposition of the material.

In order to overcome these disadvantages, the invention provides the injecting process to be carried out with a rotating screw and to increase the rate of rotation of the screw at the beginning or at the end or at the beginning and end of the plasticizing or injection process for any desired length of time and in the best possible conformity with the characteristic of the particular plastic which is being used.

The invention further provides to combine the mentioned increase in the rate of rotation of the screw at the beginning or end or at the beginning and end of a plasticizing or injection process within a selectable period of time with a suitable adjustment of the back pressure upon the screw. This may be done by reducing for a short time the feeding of the material by the screw by adjusting the back pressure and the rotation of the screw. The energy component is thereby considerably increased in relation to the plasticized material but it is thereafter reduced in accordance with the passage of time or as a result of the very hot plastic which is being fed, so that the screw will have a normal rate of feed of the material at suitable lower plasticizing temperatures. Thus, according to the invention, a supply of material with different controlled temperatures and viscosities is provided in front of the head of the screw. Because of the low heat conductivity of the plastic, these temperature differences will not as yet be balanced at the time of the injection. The portion of the material with a higher temperature has a lower viscosity and flows very easily into the mold at the beginning of the injection. It therefore facilitates the injection of the following colder portion since the flow channels are then preheated by the preceding flow and contain a solidified, heat-insulating layer of plastic.

Experiments which were made by injecting or compressing the material with a rotating screw or by injecting and compressing it showed that the screw is capable without difficulty to feed the plastic under injection pressures of more than 1000 kg./cm.$^2$ in the direction toward the head of the screw, that is, in the direction opposite to the back flow of the material, so that the back-flow check valves which have in the past been frequently applied may be omitted. By applying a positive feed of the material it is also possible to accelerate the injection process, whereby clear rheological conditions which permit the application of higher temperatures of the material are attained at the head of the screw. The application of a screw which operates in this manner therefore offers considerable advantages and also a relatively simple technical solution of the previously existing problems.

In series of tests it was found that, as the back pressure $p$ increases, the temperature $T$ of the plasticized material increases as a straight line function as shown by the straight line 9 in FIGURE 4.

Figure 5:
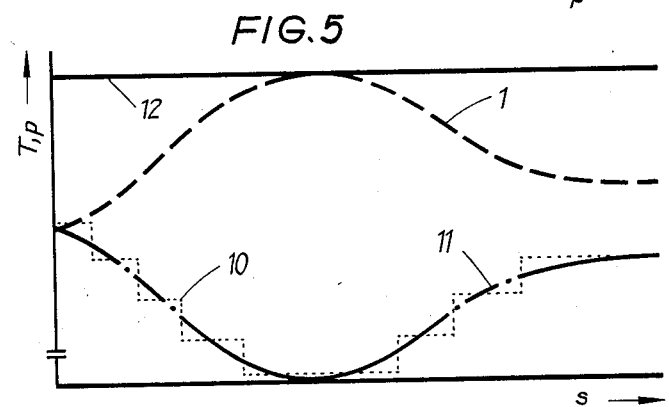
FIGURE 5 shows a graphic illustration of a pressure-stage or pressure-curve control of the back pressure and its dependence upon the distance of travel of the screw.

This functional relationship between the back pressure $p$ upon the screw and the temperature $T$ of the material is utilized in a preferred embodiment of the invention for balancing or controlling the variations of the temperature $T$ which previously were unavoidable in an intermittent process. FIGURE 5 indicates once more by the dashed curve 1 above the screw stroke $s$ the course of the temperature $T$ of the material in an intermittent process. The present invention now proposes to superimpose upon this temperature course 1 a modified steplike temperature course 10, as indicated in FIGURE 5 by the dotted lines, or a gradually varying temperature course 11, as indicated in dot-and-dash lines, by providing a controlled pressure-stage or pressure-curve adjustment of the back pressure $p$ of the screw. In this manner it is also possible to provide the material within each shot with a constant temperature during the movement of the screw, as shown by the full line $s$ in FIGURE 5.

Figure 6:
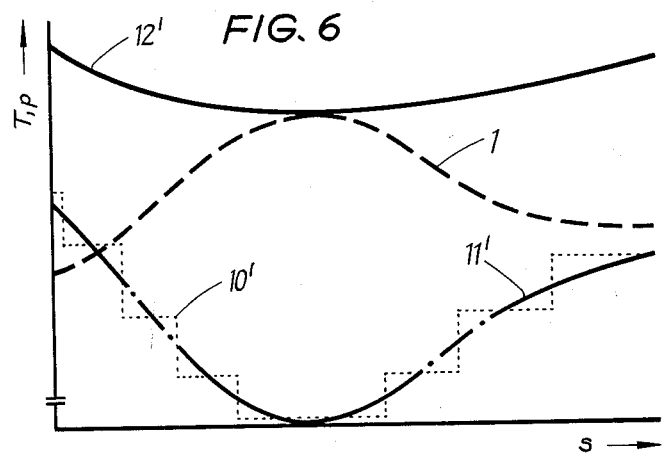
FIGURE 6 shows a graphic illustration of a pressure-stage or pressure-curve control of the back pressure and its dependence upon the distance of travel of the screw according to a modification of the invention.

According to another modification of the invention, the temperature of the material may be controlled by a predetermined steplike adjustment of the back pressure within each shot, as indicated by the dotted line 10' in FIGURE 6, or by a gradual adjustment of the back pressure, as indicated by the dot-and-dash line 11'. This may be done in such a manner that, after this control of the back pressure is superimposed upon the known course 1 of the temperature of the material, the actually effective temperature course 12' will be attained within each shot which is indicated by the full line in FIGURE 6.

In this manner it is possible to insure that the material which flows at the beginning and at the end of the injection cycle into the mold will have a higher temperature than the other parts. The aforementioned disadvantages in the production of injection-molded parts are thus avoided which are due to the fact that those parts of the material which flow into the mold at the beginning of the injection cycle as well as those which flow into the mold near the end of the cycle and therefore have to travel for the longest distance are too cold. Only by adjusting the temperature of the material by regulating the pressure stage or pressure curve according to the invention it has now become possible to attain the conditions which have to be fulfilled in order to produce a molded part of a high technical value.

The invention further provides to control the rotary movement of the screw either alone or in combination with a suitably adjusted back pressure upon the screw so as to be either gradually variable according to curves 11 or 11' or variable in steps according to steps 10 or 10', as shown in FIGURES 5 and 6, respectively, in order to attain within the plasticizing cylinder the best possible temperatures within each injection cycle, as indicated by lines 12 or 12', respectively.

Figure 7:
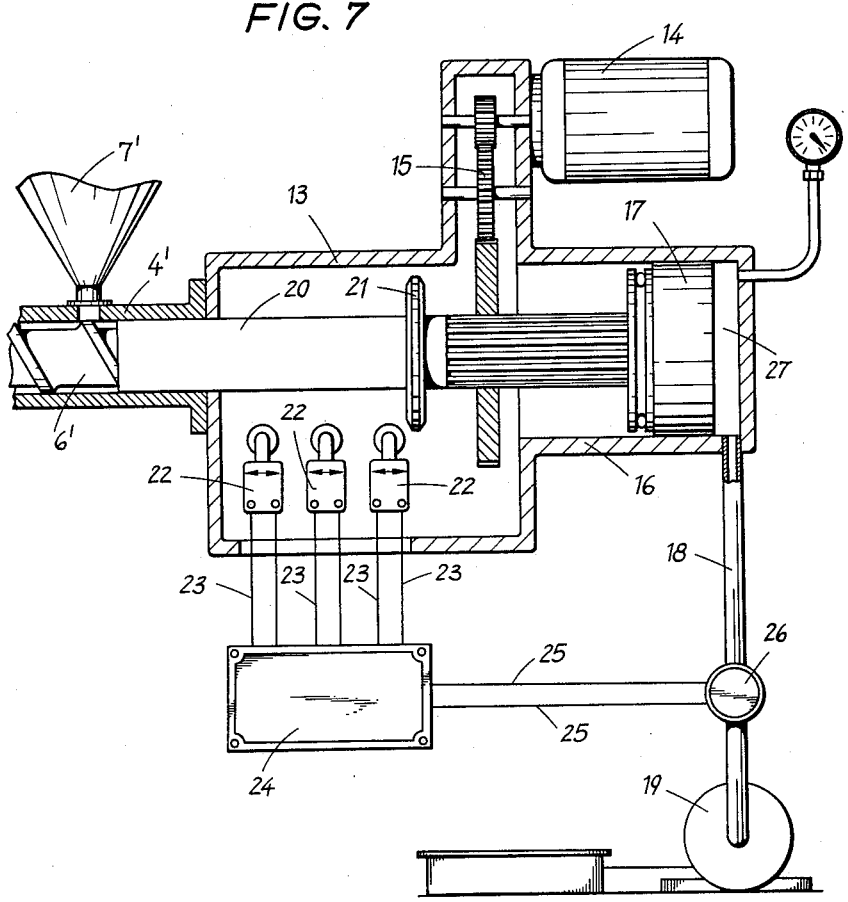
FIGURE 7 shows a general view, partly in cross section, of a screw extruder which is provided with the control means according to the invention for controlling the back pressure.
Figure 8:
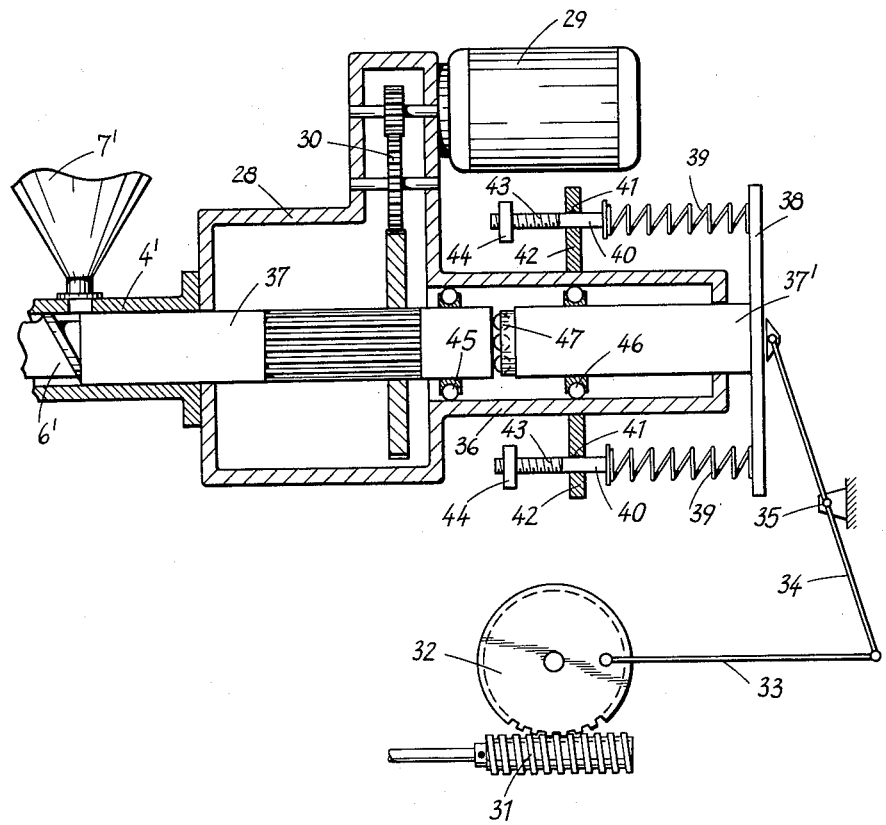
FIGURE 8 shows a general view, partly in cross section, of a screw extruder which is provided with control means according to a modification of the invention.

FIGURES 7 and 8 diagrammatically illustrate examples of hydraulic and mechanical means which may be used for carrying out the different control operations according to the invention.

According to FIGURE 7, screw 6' is movable within the plasticizing cylinder 4' which is secured to the gear housing 13. An electric motor 14 is connected by a reduction gear 15 to screw 6' for rotating the latter, while the material which is to be plasticized by screw 6' is fed thereto through a feed hopper 7'. As already stated, the rotation of screw 6' may be adjusted and controlled preferably in accordance with curves 10, 10' and 11, 11' by increasing the speed of rotation of the screw during the beginning and at the end of each injection cycle either in a gradually variable manner according to curves 11 and 11' or in a step-like manner according to curves 10 and 10'. This variation in speed of motor 14 can be effected in any manner which will produce the desirable variation of speed with time. The pressure upon screw 6' to move it in the axial direction is exerted by a piston 17 which is movable within cylinder 16 and is acted upon by a pressure medium which is supplied to cylinder 16 by a pump unit 19 through a pipe line 18.

The pressure-stage or pressure-curve control of the back pressure of screw 6' within each shot is attained in the embodiment according to FIGURE 7 by means of a contact disk 21 which is mounted on the screw shaft 20 and is adapted to engage with and actuate the stationary contacts 22 during the forward and reverse movements of screw 6'. These contacts 22 then transmit electric control impulses through lines 23 to a control cabinet 24 which contains the necessary relays and time clock which then control through lines 25 the quantity and pressure for regulating valve 26 which is connected to pipe line 18 and is thus controlled in accordance with the mentioned control impulses. The pressures within chamber 27 of cylinder 16 which are either infinitely variable or adjustable in stages to any desired amount within any selected length of time by the control elements in the control cabinet 24 and by the quantity and pressure regulating valve 26 are thus utilized for balancing the variations in the temperature of the material of each shot. As is obvious, the control impulses generated in control cabinet 24 in response to actuation of the stationary contacts 22 by the contact disk 21 could also be used to control the speed of motor 14 in accordance with curves 10, 10' and 11, 11' although it is within the contemplation of the invention that any control means suitable to provide such control may be utilized with equally effective results.

FIGURE 8 illustrates a similar apparatus in which screw 6' likewise rotates in a plasticizing cylinder 4' which is secured to a gear housing 28. Screw 6' which plasticizes the material which is fed through feed hopper 7' is rotated by an electric motor 29 through a reduction gear 30. The axial pressure is exerted upon screw 6' by a worm drive 31, 32 through a crankshaft 33 and a lever 34 which is pivotably mounted at 35.

The invention further provides that the part of the screw shaft 37' which projects from guide cylinder 36 carries a supporting plate 38 on which, for example, two coil springs 39 are mounted. The other end of each of these springs 39 is secured to a guide bolt 40 which is slidable within a suitable bore 41 in a guide plate 42. The free ends of guide bolts 40 may, for example, be provided with screw threads 43 on which nuts 44 or the like are screwed which permit the effective length of bolts 40 to be adjusted.

In order to prevent the supporting plate 38 from being affected by the rotation of screw 6', screw shaft 37 is divided into two parts, the rear part 37' of which is mounted separately from the front part within guide cylinder 36. Both parts 37 and 37' of the screw shaft are supported in guide cylinder 36 and on each other by antifriction bearings 45, 46, and 47 to reduce the friction losses as much as possible.

The apparatus according to FIGURE 8 operates as follows:

Screw 6' and screw shaft 37, 37' are shown in FIGURE 8 in the most forward position according to FIGURE 2. When the electric motor 29 is switched on, it rotates screw 6' through the reduction gear 30. Screw 6' then plasticizes the material which is fed through feed hopper 7' within the chamber intermediate nozzle 3 and the head of the screw. The material which collects in front of the screw head then forces screw 6' including shaft 37, 37' toward the rear and thereby also takes along the supporting plate 38, coil springs 39, and guide bolts 40 until the adjustable nuts 44 on guide bolts 40 engage with guide plate 42. At this time the back pressure upon the screw starts to become gradually effective in the manner according to the invention and balances the progressive decrease in the effective length of the threaded part of screw 6' and the corresponding decrease in temperature.

By suitable adjustments of the distance between nuts 44 and guide plate 42, and by exhanging coil springs 39 for other coil springs of a different strength it is possible to attain the desired control effect within each shot.

It is also within the contemplation of the instant invention to vary the speed of rotation of the screw 6' through suitable control of motor 29 in a manner similar to that described in connection with the apparatus of FIGURE 7. Again, any system which will provide the desirable control of motor 29 will fall within the contemplation of the instant invention.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a process for the operation of a screw-injection molding apparatus including a mold, a plasticizing cylinder through which plastic masses flow from an inlet to said mold and a screw slidably and rotatably arranged in said cylinder, comprising the steps of rotating said screw in said cylinder to plasticize the plastic mass initially contained in said cylinder and remaining from the previous working cycle, supplying additional plastic masses to said cylinder, plasticizing said additional masses by rotation of said screw, and feeding said plasticized masses to said mold by sliding movement of said screw, the improvement comprising a process for regulating the temperature of the plastic masses to be fed into said mold during a working cycle of the molding apparatus to produce a molded part of a high uniform quality, comprising increasing the back pressure of the rotating screw in the initial stages of the working cycle to apply additional heat to the plastic masses initially plasticized by said screw adjacent the outlet of said cylinder and remaining from the previous working cycle; ceasing the application of said increased back pressure from the masses during the middle stages of said working cycle, and again increasing the back pressure of the rotating screw during the final stages of said working cycle to supply additional heat to the additional plastic masses supplied said cylinder, whereby the temperature of the plasticized masses is controlled during said working cycle so as to avoid cold spots in the molded parts.

2. In a screw-injection molding machine having a plasticizing cylinder, a screw rotatably and slidably arranged in said cylinder for plasticizing plastic masses therein and for feeding said plasticized plastic masses therethrough, inlet means in said cylinder, means for rotating said screw, and means for axially sliding said screw in said cylinder, the improvement comprising means for controlling the temperature of the masses plasticized in said cylinder to produce molded parts of high uniform quality including control means for said axially sliding means regulating said axially sliding means to produce a high back pressure on said screw in the initial and final stages of each work cycle and a normal back pressure in the remaining portion of each work cycle to thereby increase the energy component on said plastic masses and add additonal heat to said plastic masses during said initial and final stages.

3. A machine as defined in claim 2, wherein said axially sliding means includes a pressure system and an electrically-operated valve controlling said system, and wherein said control means includes at least one adjustable contact, a contact disk secured to the screw shaft, and circuit means including said contact and contact disk for controlling operation of said valve and thereby of said axially sliding means by movement of said contact disk with respect to said contact.

4. A machine as defined in claim 2, wherein said control means includes a screw shaft projecting out of said cylinder and secured to said screw, a supporting plate secured to the outer end of said screw shaft, and two or more screw springs attached to said plate, the extremity of each said screw spring opposite the supporting plate being secured to a guide bolt displaceably and adjustably positioned in a corresponding bore of at least one guide plate.

5. A machine as defined in claim 4, wherein the guide bolts have a threading on the free end thereof, and further including at least one adjusting member screwed onto each said free end.

References Cited in the file of this patent

UNITED STATES PATENTS

| | | |
|---|---|---|
| 2,359,839 | Goessling | Oct. 10, 1944 |
| 2,411,971 | MacMillin et al. | Dec. 3, 1946 |
| 2,734,226 | Willert | Feb. 14, 1956 |
| 2,885,734 | Wucher | May 12, 1959 |
| 2,903,747 | Wucher | Sept. 15, 1959 |
| 2,944,286 | Kullgren et al. | July 12, 1960 |
| 3,001,233 | Ernst | Sept. 26, 1961 |